(12) United States Patent
Price

(10) Patent No.: US 8,312,533 B2
(45) Date of Patent: Nov. 13, 2012

(54) VIRTUAL LOCAL AREA NETWORK SWITCHING DEVICE AND ASSOCIATED COMPUTER SYSTEM AND METHOD

(75) Inventor: Darrel J. Price, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 915 days.

(21) Appl. No.: 11/926,688

(22) Filed: Oct. 29, 2007

(65) Prior Publication Data

US 2009/0113542 A1 Apr. 30, 2009

(51) Int. Cl.
G06F 9/00 (2006.01)
(52) U.S. Cl. .............. 726/15; 726/3; 709/238; 370/238; 370/351; 370/400; 370/407; 713/153; 713/166; 379/901
(58) Field of Classification Search .................... 726/15, 726/3; 709/238; 370/238, 400, 407, 351; 713/153, 166; 379/901
See application file for complete search history.

(56) References Cited

U.S. PATENT DOCUMENTS

| 2002/0069294 A1* | 6/2002 | Herkersdorf et al. ......... 709/238 |
| 2002/0101867 A1* | 8/2002 | O'Callaghan et al. ........ 370/389 |
| 2003/0165144 A1* | 9/2003 | Wang ............................ 370/400 |

FOREIGN PATENT DOCUMENTS

GB 2 362 289 A 11/2001

OTHER PUBLICATIONS

M.Bechler; A cluster-Based Security Architecture for Ad Hoc Network; Year: 2004; IEEE; pp. 1-11.*
Boeing Technology; Phantom Works; The Boeing Secure NetworkServer SNS-3010; Information Assurance; The Boeing Company; Seattle, Washington; © 2005; 2 pages.

* cited by examiner

*Primary Examiner* — April Shan
(74) *Attorney, Agent, or Firm* — Alston & Bird LLP

(57) ABSTRACT

A virtual local area network switching device and an associated computer system and method are provided to permit operation in accordance with a plurality of different security classifications. The computer system includes a computer, a virtual local area network switching device and a plurality of peripheral units having different security classifications. The virtual local area network switching device may include a computing device that includes the plurality of ports and that is configured to control communications with the peripheral units in accordance with the respective security classifications. The virtual local area network switching device may also include a memory device configured to store information associating the plurality of the ports with the security classification of the respective peripheral unit. The memory device may also store information associating each port with both a logical address and a physical address of the respective peripheral units.

20 Claims, 3 Drawing Sheets

VIRTUAL LOCAL AREA NETWORK SWITCHING DEVICE AND ASSOCIATED COMPUTER SYSTEM AND METHOD

FIELD OF THE INVENTION

Embodiments of the present invention relate generally to a computer system operable in accordance with a plurality of different security classifications and, more particularly, a computer system having a virtual local area network switching device that is configured to appropriately direct communication with and/or between a plurality of peripheral units in accordance with a plurality of different security classifications.

BACKGROUND OF THE INVENTION

Some computer systems must be designed to operate in a secure environment. For example, tactical edge platforms that are employed on military aircraft may be required to operate in a secure or secret mode. By operating in a secure mode, a computer system processes data and communicates with various peripheral units in a manner that maintains the security of the data and significantly mitigates against the risk of any unsecured access to the data.

As used herein, the security level of a computer system relates to the classification level or compartmental level of the devices or users connected to the computer system or the data transmitted via the computer system. In general, an unsecure network is a computer system in which the network infrastructure has no knowledge of the classification levels of the devices connected to the network port. On the other hand, a secure network is a computer system in which the network infrastructure, with a high degree of assurance, can maintain separation of data traversing the network and can guarantee that the data entering a given port is only accessible to a subset of the available ports based on a set of rules.

One example of a computer system designed to operate in a secure manner is a tactical edge platform which includes a mission computer and a number of peripheral units connected to the mission computer via a physical network, such as a MIL-STD 1553 bus (hereinafter a "1553 bus"). As shown in FIG. 1, for example, the mission computer 12 of a tactical edge platform 10 may include two or more general purpose processors (GPPs) 14. Each GPP will be in communication with one or more 1553 buses, each of which is connected to one or more peripheral units so as to, for example, balance the loads of the GPPs. The tactical edge platform may include a variety of peripheral units including a navigation suite having an initial navigation system (INS) 16, a tactical suite including a radar warning receiver (RWR) 18 and a radar 20, a communications suite including a multifunctional information distribution system (MIDS) 22, and an air vehicle suite including an air data computer (ADC) 24, a data transfer unit (DTU) 26 and a maintenance port 28. The peripheral units can have various security classification levels. For example, the INS and the ADC are typically unclassified, while the RWR is typically classified as secret when in operation. Additionally, some peripheral units may have security classification levels that change. For example, the radar may be unclassified while operating in certain modes, while being classified as secret in other modes. Additionally, the DTU will generally have a classification level that is defined based upon a cartridge that is installed therewithin. Similarly, the MIDS will generally have a security classification level that is based upon the cryptographic key that is installed within the MIDS.

Although some of the peripheral units, such as the INS and the ADC may be unclassified, the entire tactical edge platform is operated at the highest security classification level of any of the peripheral units, such as at the secret mode in the example provided above. In order to insure that the tactical edge platform 10 operates in a secure manner, the tactical edge platform is designed such that a mission computer 12 controls all communications via the 1553 buses with the peripheral units. The mission computer therefore includes a security kernal that operates in a secure mode along with the device drivers, file systems, network input/output, etc.

In order to certify the tactical edge platform 10 to operate in a secure mode, the secure kernal generally undergoes a verification process to insure that the mission computer 12 can be trusted to a high assurance (HA) level. Since the mission computer controls all communication via the 1553 buses with the peripheral units, the peripheral units generally need not be similarly verified. However, since the security kernal of a conventional mission computer includes a relatively large block of software code with unlimited interaction, the verification of the mission computer including the security kernal to an HA level is typically a time-consuming and expensive process.

As exemplified by the tactical edge platform 10 of FIG. 1, if a plurality of devices of different classification levels are connected to a secure network, only the network infrastructure would need to be trusted to an HA level so that the infrastructure itself can guarantee that each device will only have access to appropriately classified data, thereby avoiding the time and expense associated with otherwise certifying that the individual devices could be trusted. Conversely, if devices of different classification levels are connected to an unsecure network, every device connected to the network would have to be trusted to an HA level since the network itself is unsecure. In other words, since data at all classification levels would be available to every device, each device would have to insure that it could not access inappropriately classified data. Since the HA certification process is quite expensive and time-consuming, a network configuration in which every device must be trusted to an HA level is generally impractical.

While the operation of an entire computer system, such as a tactical edge platform, in a secure mode has been workable, there is an increased emphasis on the development of a computer system that does not operate entirely in a secure mode, but is capable of operating in an environment having multiple levels of security, i.e., within a multi level security (MLS) environment, while maintaining appropriate separation of data of different security classification levels. In this regard, there is an emphasis to transition from a computer network utilizing a 1553 bus to a computer system utilizing a high speed backplane, such as the Ethernet, and a more ubiquitous protocol, such as internet protocol (IP). If computer systems, such as tactical edge platforms, transition to an Ethernet network, but still require that the entire computer system only operate in a secure mode, each of the general purpose Ethernet infrastructure devices, such as the switches and routers, would need to be certified to be trusted at an HA level, thereby rendering such a design relatively infeasible due to the costs and risks of having any, let alone, each device evaluated at an HA level. Accordingly, it would be desirable to develop a computer system in which portions of the computer system operated in accordance with an unsecure or, at least, a less secure mode, while other portions of the computer system operated in a more secure mode, thereby limiting the device (s) and/or code that must be certified to the HA level.

Office networks and command and control ($C^2$) networks have been developed which concurrently support both secure and unsecure modes of operation. In this regard, an office or a $C^2$ network is designed to connect general purpose computing devices, such as workstations, printers, mass storage, etc., to any port of a network switching device and to be able to locate, or be located by, other devices on a network using protocols such as domain name system (DNS), dynamic host configuration protocol (DHCP) and address resolution protocol (ARP). The workstations connected to such a network will typically be executing large, complex operating systems, such as UNIX or Windows, with a great degree of control available to the operator. Moreover, the processes that are executed by the various devices may be quite dynamic and under the direct control of multiple human operators. In addition, with the proper credentials, operators can typically manipulate the devices from remote locations.

The design objectives of an office or a $C^2$ network diverge dramatically from those of a tactical edge platform which generally has a specific, well known set of special purpose devices connected to specific ports of the network switch. Each device is configured to perform a specific set of tasks with little or no operator intervention. In this regard, operator input is very limited with little or no mechanism for an operator to introduce new processes into the system that are not already resident or that have not undergone extensive testing. Additionally, a tactical edge platform is generally configured in such a manner that it is physically impossible to modify the hardware configuration while in operation, with only qualified technicians having physical access to the platform during maintenance procedures.

The computer systems developed for an office or a $C^2$ network to provide an HA MLS environment are generally inapplicable for tactical edge platform environments. In particular, an office and a $C^2$ network generally provide for routing and data filtering which increase the size and complexity of the underlying software code. As such, if an effort were made to certify an office or a $C^2$ network for use as a tactical edge platform, the software code associated with the routing and data filtering would have to be verified to the HA level even though the tactical edge platform would either not need all of the routing and data filtering functionality or could provide some of the routing and data filtering functionality in a manner that did not require as high of a security classification level. Additionally, an office and a $C^2$ system generally utilizes devices, such as workstations, that are too large and too heavy for most, if not all, tactical edge platforms which are, instead, designed to be deployed under significant size and weight restrictions. Additionally, the power consumption of a typical office or $C^2$ system is also generally much greater than that allowed of a tactical edge platform.

Accordingly, it would be desired to provide a computer system configured to operate in accordance with a plurality of different security classifications which, in one embodiment, could satisfy the size, weight and power requirements imposed upon a tactical edge platform.

BRIEF SUMMARY OF THE INVENTION

A virtual local area network switching device and an associated computer system and method are provided according to embodiments of the present invention to provide for operation in accordance with a plurality of different security classifications. As such, the virtual local area switching device and the associated computer system and network of one embodiment can provide an HA MLS network, such as for deployment in a tactical edge environment or the like, while only requiring some, but not all of the devices and the code to be certified to the HA level.

In accordance with one aspect of the present invention, a computer system is provided that is configured and operated in accordance with a plurality of different security classifications. The computer system includes a computer having at least one processor, a virtual local area network switching device and a plurality of peripheral units. The plurality of peripheral units include at least one peripheral unit configured to have a first security classification and at least one peripheral unit configured to have a second security classification that is less secure than the first security classification. In addition, the virtual local area network switching device also generally has a security classification at least as secure as the first security classification, e.g., the highest security classification maintained by any one of the computer and peripheral units.

The virtual local area network switching device of one aspect of the present invention includes a computing device that includes the plurality of ports and that is configured to control communications with the peripheral units in accordance with the respective security classifications. The computing device is in communication with the computer via at least one of the ports and with the plurality of peripheral units via other respective ports. Additionally, the virtual local area network switching device includes a memory device configured to store information associating the plurality of the ports with the security classification of the respective peripheral unit in communication therewith. Additionally, the memory device may be configured to store information associating each port with both a logical address and a physical address of the respective peripheral units that are configured in communication therewith.

In operation and in accordance with the method of one aspect of the present invention, the virtual local area network switching device is configured to receive a request from a source device for communication with a destination device with which the source device desires to communicate. The source device may be either the computer or one of the peripheral units, while the destination device is another one of the computer and the peripheral units. The virtual local area network switching device is also configured to determine if the requested communication should be granted based upon the respective security classifications of the source device and destination device. In one embodiment, the request from the source device includes the logical address of the destination device and requests that the corresponding physical address be provided. In this embodiment, the virtual local area switching device is configured to provide the physical address of the destination device to the source device if the virtual local area switching device has determined that the request for communication should be granted based upon the respective security classifications of the source device and the destination device.

After providing the physical address of the destination device, the virtual local area network switching device may be configured to receive a frame from the source device as well as the physical address of the destination device. In response, the virtual local area network switching device may be configured to again determine if the frame should be transferred to the destination device based upon the respective security classifications of the source device and destination device. In instances in which the security classification of the destination device exceeds the security classification of the source device, the virtual local area network switching device is configured to change a source address associated with the source device to no longer reference the source device. The virtual local area network switching device may also be configured to forward the frame and the source address to the destination device if it was determined that the frame should be transmitted to the destination device based upon the respective security classifications of the source device and the destination device.

The virtual local area network switching device may also be configured to receive a response to the frame from the destination device that is directed to the source address that has been changed. The virtual local area network switching device of this embodiment will also be configured to discard the response without forwarding the response to the source device.

In determining if the request to communicate should be granted, the virtual local area network switching device may be configured to grant the requested communication if the security classification of the source device is no more secure than the security classification of the destination device and to deny the request to communicate if the security classification of the source device is more secure than the security classification of the destination device. As such, the virtual local area network switching device as well as the associated computer system and method provide for multiple levels of security within the same platform by preventing direct communication between the computer and the peripheral units and by controlling the transmission frames of data, commands and the like between the computer and peripheral units so as to prevent frames of a higher security classification level from being provided to the computer or a peripheral unit having a lower security classification level. By controlling the communications between the computer and the peripheral units via the virtual local area network switching device, however, only the virtual local area network switching device and an associated controller need be certified or trusted to an HA level.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
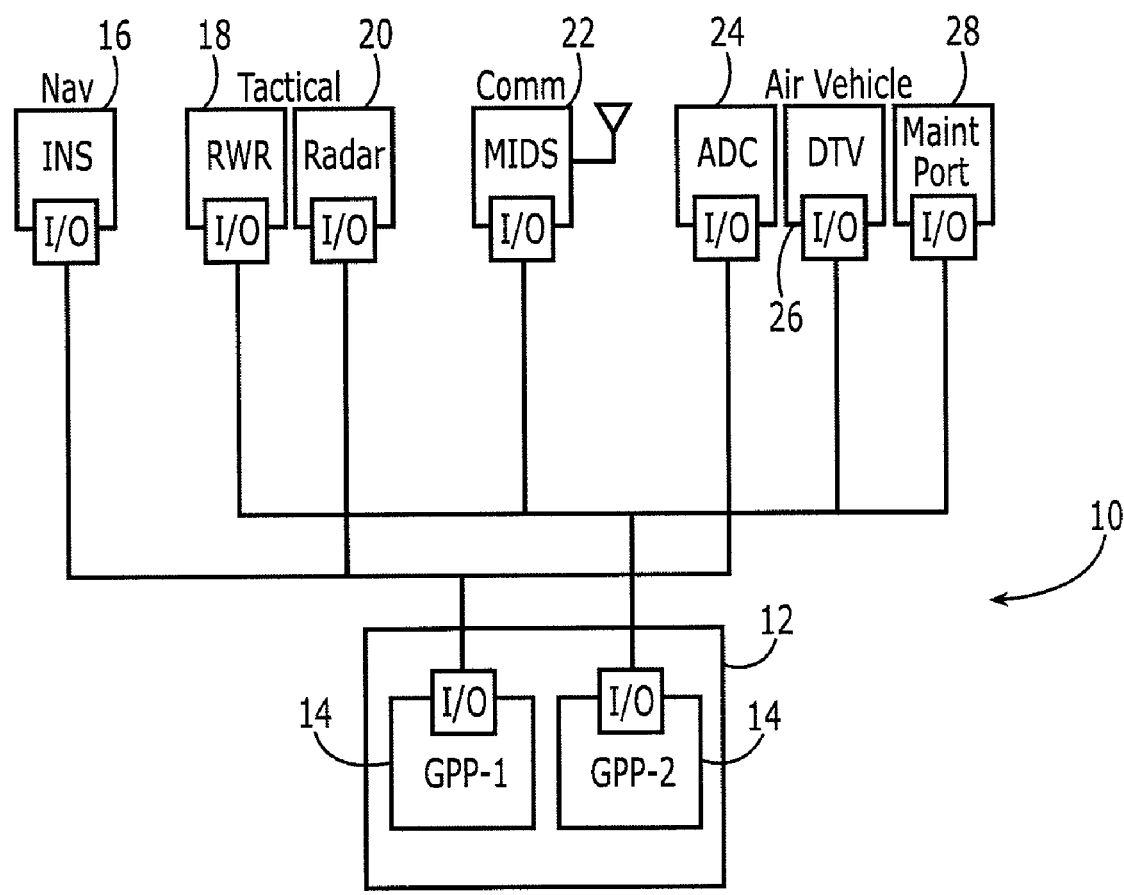
FIG. 1 is a block diagram of a conventional tactical edge platform.
Figure 2:
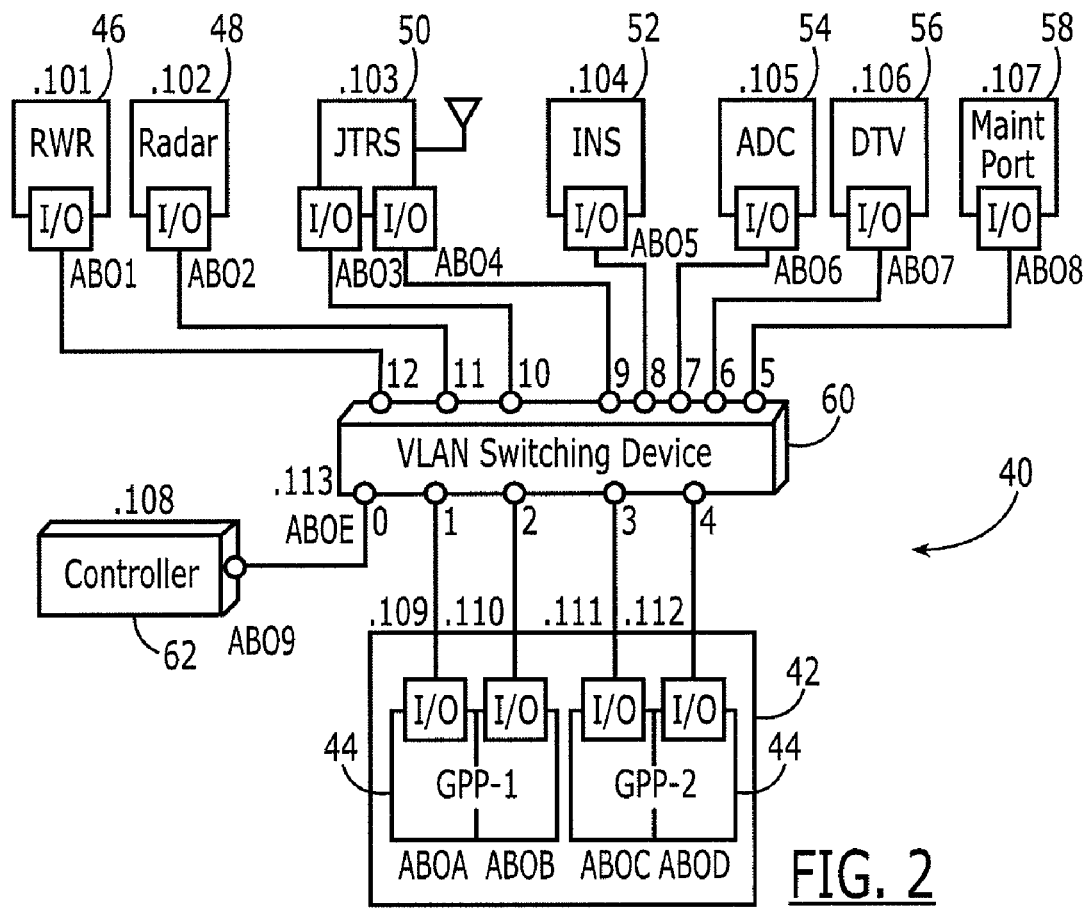
FIG. 2 is a block diagram of a computer system including a virtual local area network switching device in accordance with one embodiment of the present invention.

Referring now to FIG. 2, a computer system 40 of one embodiment of the present invention that is configured to operate in accordance with a plurality of different security classifications is depicted. While the computer system will be generally described herein as a tactical edge platform for deployment onboard an aircraft or other air vehicle, the computer system may be utilized in a wide variety of other applications that are designed to operate in accordance with a plurality of different security classifications. In addition, while the computer system will be primarily described herein in conjunction with the transmission of a frame, such as data, a command or the like, that is either secure or unsecure, the computer system can be deployed in applications having a large number of different security classifications, if so desired.

The computer system 40 includes a computer 42 having at least one processor 44. In this regard, the processor may be a microprocessor, an application-specific integrated circuit (ASIC) or any other type of computing device. In one example, the computer is a mission computer having two or more general purpose processors (GPPs). The computer system also includes a plurality of peripheral units configured to communicate either with one another or with the computer. In the illustrated embodiment, the peripheral units include an RWR 46, a radar 48, a joint tactical radio system (JTRS) 50, an INS 52, an ADC 54, a DTU 56 and a maintenance port 58. However, the computer system may include a wide variety of other peripheral units including computer workstations, storage devices and the like.

Figure 3:
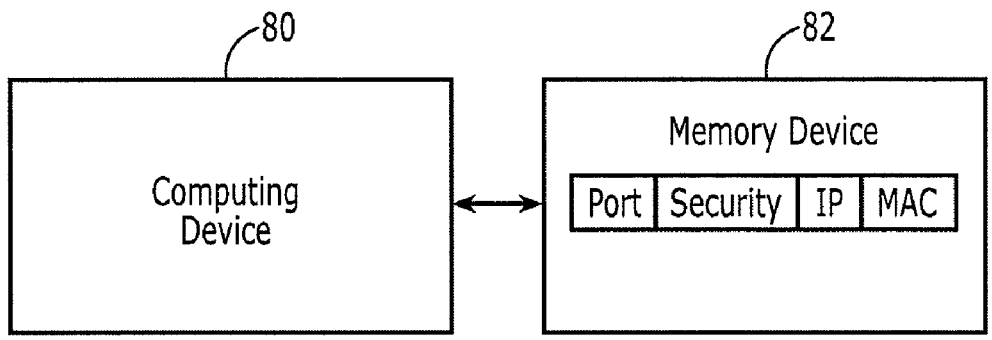
FIG. 3 is a block diagram of a virtual local area network switching device in accordance with one embodiment of the present invention.

As noted above, the peripheral units and the computer 42 must generally communicate with one another to effect the operation of the computer system 40. In order to appropriately segregate the frames that are routed between the computer and the peripheral units based upon the different security classification levels of the computer and the peripheral unit, the computer system advantageously includes a virtual local area network switching device 60 that manages the communications between the peripheral units and the computer in accordance with the different security classification levels. Although the virtual local area network switching device can be configured in various manners, the virtual local area network switching device of one embodiment is depicted in FIG. 3. In this regard, the virtual local area network switching device may include a computing device 80 having a plurality of ports (as shown in FIG. 2) for individually communicating with respective ports of the computer and the plurality of peripheral units. In one embodiment, the computing device may be a virtual machine environment (VME)- or peripheral component interconnect (PCI)-based single board computer having multiple network interface cards (NICs) for communicating with the peripheral units and the computer. Although the communication links between the virtual local area network switching device and the peripheral units and the computer may take various forms and transmit data in accordance with various protocols, the computer system of one embodiment utilizes an Ethernet network with data transmitted between the virtual local area network switching device, the peripheral units and the computer in accordance with internet protocol (IP).

As noted above, the computing device 80 of the virtual local area network switching device 60 includes a plurality of ports individually communicating with the computer 42 and the plurality of peripheral units. While the virtual local area network switching device can include any number of ports, the virtual local area network switching device of the embodiment depicted in FIG. 2 includes 13 ports designated port 0, port 1, port 2, ... port 11 and port 12. Ports 5-12 of the virtual local area network switching device of FIG. 2 communicate with one or more of the peripheral units. While most of the peripheral units include a single port for effecting communications with the virtual local area network switching device, one or more of the peripheral units can include two or more ports that individually communicate with respective ports of the computing device of the virtual local area network switching device. For example, the JTRS 50 of the illustrated embodiment includes two ports that are each individually connected to respective ports of the computing device of the virtual local area network switching device. In this regard, the communications links established between the virtual local area network switching device and the JTRS may be such that one port is dedicated to the transmission and reception of data having a first security classification level, e.g., secure, and the other port is dedicated to the transmission and reception of data having a different security classification level, e.g., unsecure. Ports 1-4 of the virtual local area network switching device of FIG. 2 communicate with the GPPs 44 of the computer 42. In a similar fashion to that described above in conjunction with the JTRS, each GPP 44 of the illustrated embodiment includes two ports that are each individually connected to respective ports of the computing device of the virtual local area network switching device. As with the JTRS, each port of a GPP may be dedicated to the transmission and reception of data having a different security classification level than the data transmitted and received by the other port of the GPP. Finally, port 0 of the illustrated embodiment of the virtual local area network switching device is in communication with a controller 62 for configuring the virtual local area network switching device, as described below.

As shown in FIG. 3, the virtual local area network switching device 60 also includes a memory device 82 for storing information relating to the plurality of ports of the computing device 80. In this regard, the memory device generally stores information defining the security classifications of the respective peripheral units and the computer 42 that are in communication with the virtual local area network switching device. Additionally, the memory device generally stores information that associates each port with both a logical address and a physical address of the respective peripheral units or computer in communication therewith. Although various types of logical addresses and physical addresses can be employed, IP addresses and MAC addresses will be hereinafter described as examples of the logical addresses and the physical addresses, respectively. In this regard, the IP and MAC addresses of each of the ports of the peripheral units and the computer are depicted in FIG. 2 with the IP and MAC addresses having been shortened for ease of reference. However, the reference to IP addresses and MAC addresses is merely as an example and not as a limitation. As described below, the memory device of the virtual local area network switching device may include a table which associates each port with a security classification level, a logical address and a physical address of the respective computer or peripheral unit that is in communication with the respective port.

As noted above, the peripheral units and the computer 42 and, more particularly, the ports of the peripheral units and the computer can have various security classification levels. In particular, the peripheral units and the computer include at least one port configured to have a first security classification, e.g., secure, and at least one port configured to have a second security classification, e.g., unsecure, that is less secure than the first security classification. As the virtual local area network switching device 60 controls the communication between the peripheral units and the computer, the virtual local area network switching device also has a security classification level, e.g., first security classification level, that is at least as secure as the highest security classification level of any of the peripheral units and the computer with which the virtual local area network switching device is in communication.

The security classification levels can be defined in various manners. In one embodiment, however, a port will be assigned a security classification level of 0 if the port is inactive, a security classification level of 1 if the port is intended to support unclassified communications, and a security classification level of 2 if the port is intended to support secret or secure communication. As to the IP address, the IP address of each port of the peripheral units and the computer 42 are static and will be generally assigned by the system architect and input into each peripheral unit and the computer by the system maintainer. The MAC addresses of each port of the peripheral units and the computer are dependent on the particular unit that is installed and will be provided to the virtual local area network switching device 60 for storage in the memory device 82 upon power up or during an initiated built in test (IBIT) sequence as described below.

In one embodiment in which the RWR 46, the radar 48 and one port of each of the JPRS 50, GPP-1 44 and GPP-2 44 are intended to communicate in accordance with a first security classification level, such as a secret classification, and the INS 52, the ADC 54, the DTU 56, the maintenance port 58 and one port of each of the JTRS, GPP-1 and GPP-2 are configured to communicate in accordance with a second security classification level, such as an unclassified level, the memory device 82 of the virtual local area network switching device 60 may be initially configured to store the information set forth in Table 1 below.

TABLE 1

| Port | Class. | IP | MAC |
|------|--------|------|------|
| 0 | 1 | .113 | 0000 |
| 1 | 2 | .109 | 0000 |
| 2 | 1 | .110 | 0000 |
| 3 | 2 | .111 | 0000 |
| 4 | 1 | .112 | 0000 |
| 5 | 1 | .107 | 0000 |
| 6 | 1 | .106 | 0000 |
| 7 | 1 | .105 | 0000 |
| 8 | 1 | .104 | 0000 |
| 9 | 1 | .103 | 0000 |
| 10 | 2 | .103 | 0000 |
| 11 | 2 | .102 | 0000 |
| 12 | 2 | .101 | 0000 |

Since the MAC addresses of the ports of the peripheral units and the computer 42 are only provided to the virtual local area network switching device 60 upon power up or during IBIT, the memory device 82 initially does not include the MAC addresses, as shown by Table 1 above. However, the IP address and the security classification levels may be stored in advance by the memory device of the virtual local area network switching device in response to input by the system architect or the system maintainer. Alternatively, in embodiments in which it may be desirable to modify the information stored by the memory device, the computer system 40 may also include a controller 62 that communicates with the virtual local area network switching device and, in particular, the computing device 80 for modifying the information stored by the memory device and accordingly reconfiguring the virtual local area network switching device. In embodiments that include a controller, the security classification levels and the IP addresses associated with each port may be loaded into the memory device by the controller during an initialization routine.

Since the virtual local area network switching device 60 of this embodiment is managed by the controller 62, the virtual local area network switching device itself will only have an IP address and a MAC address assigned to the port in communication with the controller, such as port 0 in the illustrated embodiment. Additionally, the information stored by the memory device in association with the port that is in communication with the controller, such as port 0, is the IP and MAC addresses of the virtual local area network switching device as opposed to the IP and MAC addresses of the controller.

In order to populate the memory device with the physical addresses of the peripheral units and the computer 42, the computing device 80 of the virtual local area network switching device 60 is configured to transmit ARP requests to the various peripheral units and the computer in response to power up or an IBIT sequence. In this regard, the virtual local area network switching device of one embodiment, in response to power up or IBIT, will enter the MAC address of the virtual local area network switching device itself as the MAC address associated with port 0 and, for all other ports, will send an ARP request via the respective port along with the IP address associated with the respective port. If an ARP reply is received, the computing device of the virtual local area network switching device will obtain the MAC address from the reply and will store the MAC address in the memory device in association with the respective port number. As such, following power up or IBIT, the memory device 82 of the illustrated embodiment will have populated the MAC addresses for the ports and will store the following information:

TABLE 2

| Port | Class. | IP | MAC |
|---|---|---|---|
| 0 | 1 | .113 | AB0E |
| 1 | 2 | .109 | AB0A |
| 2 | 1 | .110 | AB0B |
| 3 | 2 | .111 | AB0C |
| 4 | 1 | .112 | AB0D |
| 5 | 1 | .107 | AB08 |
| 6 | 1 | .106 | AB07 |
| 7 | 1 | .105 | AB06 |
| 8 | 1 | .104 | AB05 |
| 9 | 1 | .103 | AB04 |
| 10 | 2 | .103 | AB03 |
| 11 | 2 | .102 | AB02 |
| 12 | 2 | .101 | AB01 |

In instances in which a peripheral unit or the computer 42 is changed, the new unit will have a different MAC address. As such, the procedure that the maintainer will follow for replacing the unit will be to set the IP address of the unit to be the IP address associated with the respective port via which the unit communicates with the virtual local area network switching device 60 and to then perform an IBIT on the virtual local area network switching device which will cause the MAC addresses stored by the memory device to be updated as described above.

In addition to the security classification levels, IP addresses and MAC addresses associated with each port, the memory device 82 of the virtual local area network switching device 60 also generally stores security policies or rules which control the flow of data within the computer system. In one embodiment, the security policies or rules are loaded into the memory device from the controller 62. In one embodiment, the rules that govern the data flow through the computer system 40 are that:

1) data may pass from a first port to a second port if the second port has a security classification level that is greater than or equal to the security classification level of the first port, and 2) data shall not pass from a first port to a second port in instances in which the second port has a lower security classification level unless the first port has a security classification level of 0xFFFF as described below. In one embodiment, a security classification level of 0xFFFF indicates that the device attached to the port has itself been certified to a high assurance level and capable of operating at multiple security levels.

The virtual local area network switching device 60 also includes a number of other rules which are typically immutable, such as by being hard-coded into the memory device 82. In order to simplify the following explanation, the controller 62 will be considered to be in communication with port 0 of the virtual local area network switching device. However, it should be apparent that the controller could alternatively be in communication with other ports of the virtual local area network switching device, if so desired. In instances in which the controller is communication with port 0 of the virtual local area network switching device, however, the virtual local area network switching device may also include the following rules:

1) frames for which the virtual local area network switching device is the ultimate destination will only be recognized if received on port 0, 2) a peripheral unit that is uninitialized will have a security classification level of 0, 3) a hard reset will cause the security classification level at all ports to be set at 0, 4) any port, other than port 0, having a classification of 0 will be considered inactive with no frames being sent or received thereby, 5) the virtual local area network switching unit will respond to ARP requests based on information stored by the memory device without broadcasting the ARP request, 6) the virtual local area network switching device shall not respond to ARP requests from a port having a security classification level which is greater than the security classification level of the destination port, and 7) when a frame is forwarded from a port having a security classification level that is lower than the port to which the frame is forwarded, the source address will be changed as described below, unless the security classification level of the destination port is 0xFFFF as also described below.

As described below, in order to implement these characteristics, the memory device 82 of the virtual local area network switching device 60 can also store information in association with two additional pseudo ports, that is, ports 100 and 101, as follows:

TABLE 3

| Port | Class. | IP | MAC |
|---|---|---|---|
| 100 | 1 | 0 | ABFF |
| 101 | 2 | 0 | ABFE |

Ports 100 and 101 are used to disguise the address of a device attached to a port with a lower security level when that device sends a frame to a port with a higher security level, and also to inhibit an entry in the security audit log in the case that the device attached to the higher security level port attempts to respond to the device attached to the lower security level port. This process is accomplished as follows: (1) when a frame is forwarded from a lower classification port to a higher classification port, the source MAC address embedded in the frame is changed to ABFE and (2) if a frame is then received on the higher classification port with a destination MAC address of ABFE, the virtual local area network switching device recognizes this frame as a special case and discards the frame without generating a security log entry, as described below.

Figure 4:
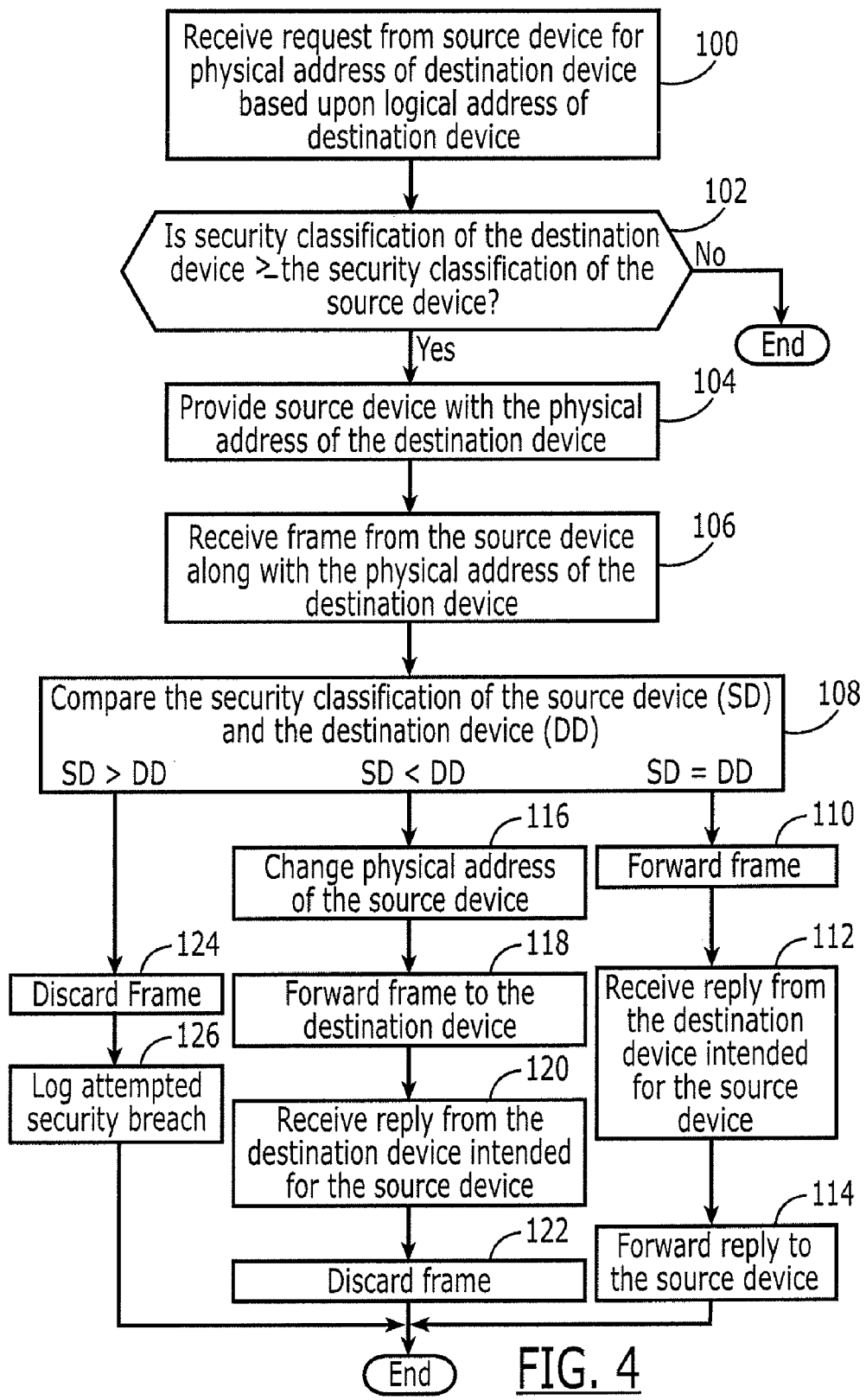
FIG. 4 is a flow chart of operations performed in accordance with one embodiment of the present invention.

In accordance with the foregoing rules and based on the respective security classification levels, the virtual local area network switching device 60 controls communication between the peripheral units and the computer 42 as shown in FIG. 4. As shown in block 100, the virtual local area network switching device is configured to receive a request from a source device for communication with a destination device. The source device is either the computer or one of the peripheral units, while the destination device is another one of the computer and the peripheral units. The virtual local area network switching device is also configured to determine if the requested communication should be granted based upon the respective security classifications of the source device and destination device. In one embodiment, the request from the source device includes the logical address of the destination device and requests that the corresponding physical address be provided. In this embodiment, the virtual local area switching device is configured to provide the physical address of the destination device to the source device if the virtual local area network switching device has determined that a request for communication should be granted based upon the respective security classifications of the source device and the destination device. As shown in blocks 102 and 104, for example, the virtual local area network switching device may be configured pursuant to the foregoing rules to permit communication and, therefore, provide the physical address of the destination device if the security classification level of the destination device is equal to or greater than the security classification level of the source device. Conversely, the virtual local area network switching device may be configured not to permit communication and not to provide the physical address of the destination device if the security classification level of the destination device is less than the security classification level of the source device.

After providing the physical address of the destination device to the source device, the virtual local area network switching device 60 may be configured to receive a frame from the source device as well as the physical address of the intended destination device. See block 106. In response, the virtual local area network switching device may be configured to again determine if the frame should be transferred to the destination device based upon the respective security classifications of the source device and destination device. See block 108. If the security classification of the source device is less than or equal to the security classification of the destination device, the virtual local area network switching device is configured to forward the frame and the source address to the destination device as shown in blocks 110 and 118. While the source address is the address of the source device in instances in which the security classification of the source device is equal to the security classification of the destination device, the virtual local area network switching device is configured to change the source address to no longer reference the source device in instances in which the security classification of the source device is less than the security classification of the destination device, as shown in block 116. As will be described below, by changing the source address, the virtual local area network switching device can prevent any reply from the destination device from being forwarded to the source device, thereby avoiding communications from a device with a higher security classification level to a device with a lower security classification level. In this regard, the virtual local area network switching device may change the source address to be ABFE, which will be recognized by the virtual local area network switching device in the process of analyzing any reply to be an internal address such that the reply will not be forwarded, but will, instead, be discarded.

As shown in blocks 112 and 120, the virtual local area network switching device 60 may also be configured to receive a response to the frame from the destination device that is directed to the source address. In instances in which the virtual local area network switching device recognizes that the source address has been changed, such as by determining that the source address is an internal address, the virtual local area network switching device of this embodiment will also be configured to discard the response without forwarding the response to the source device. See block 122. Conversely, if the source address is not recognized as an internal address, the virtual local area network switching device can determine that the security classification levels of the source device and the destination device are equal and, if so, forward the reply to the source device, as shown in block 114.

As described above, the virtual local area network switching device 60 may be configured to grant the requested communication if the security classification of the source device is no more secure than the security classification of the destination device. However, in instances in which the security classification of the source device is more secure than the security classification of the destination device, the request for communication can be denied with the frame provided by the source device being discarded and the attempted security breach being optionally logged. As such, the virtual local area network switching device as well as the associated computer system 40 and method provide for multiple levels of security within the same platform by preventing direct communication between the computer 42 and the peripheral units and by controlling the transmission frames of data, commands and the like between the computer and peripheral units so as to prevent frames of a higher security classification level from being provided to the computer or a peripheral unit having a lower security classification level.

By way of example of an instance in which the communication request is granted by the virtual local area network switching device 60, consider the scenario in which the secure port of GPP-1 42 desires to change the mode of the radar 48. In this scenario, the virtual local area network switching device will receive an ARP request from port 1 associated with GPP-1 that includes the IP address .102 of the radar. The computing device 80 of the virtual local area network switching device will retrieve the security classification level associated with an IP address of .102. Since the security classification level associated with the IP address of .102 equals the security classification level associated with port 1 via which the ARP request was received, an ARP response will be provided via port 1 which provides the MAC address of the radar, that is, AB02. Thereafter, the virtual local area network switching device may receive a frame, such as a UDP mode change command, via port 1 with a destination MAC address of AB02. In response, the virtual local area network switching device will determine the security classification level associated with a MAC address of AB02. Since the security classification level associated with the MAC address of AB02 equals the security classification level associated with the port via which the frame was received, that is, port 1, the frame and its source address, i.e., the MAC address (e.g., AB0A) of port 1 of GPP-1, will be forwarded to the radar via port 11. In response, the virtual local area network switching device will receive a frame, such as UDP mode change acknowledge frame, from the radar on port 11 with an intended destination of AB0A. In response, the virtual local area network switching device again determines the security classification level associated with a MAC address of AB0A. Since the security classification level associated with a MAC address of AB0A equals the security classification level associated with port 11 via which the UDP mode change acknowledge frame was received, the frame will be forwarded to GPP-1 via port 1.

By way of another example in which the security classification level of the destination device is greater than the security classification level of the source device, consider the scenario in which the unclassified port of GPP-2 44 commands the RWR 46 which has a secret security classification into IBIT mode. In this scenario, the virtual local area network switching device 60 receives an ARP request from GPP-2 via port 4 with an intended destination having an IP address of .101, thereby identifying the RWR as the destination device. The virtual local area network switching device then determines the security classification level associated with an IP address of .101. Since the security classification level associated with an IP address of .101 is greater than the security classification level of the source device associated with port 4, an ARP response will be sent via port 4 which provides the MAC address of AB01 associated with the IP address of .101. Thereafter, the virtual local area network switching device will receive a frame, such as a UDP initiate IBIT command, on port 4 which identifies the destination device by the MAC address of AB01. The virtual local area network switching device will then determine the security classification level associated with the MAC address of AB01. Since the security classification level associated with the MAC address of AB01 is greater than the security classification level associated with port 4, the source address associated with the frame is changed to ABFE and the frame is then forwarded to the intended destination via port 12, that is, the port associated with a MAC address of AB01. Thereafter, the virtual local area network switching device can receive a frame, such as a UDP mode change acknowledge frame, from the RWR on port 12 with the intended destination having a MAC address of ABFE. In other words, the MAC address of the intended destination is identified as the source address that was provided by the frame transmitted to the RWR. The virtual local area network switching device then determines the security classification level associated with the MAC address of ABFE. Since the classification level of the intended destination equals the security classification level associated with port 12, that is, the source of the reply frame, no security audit log entry is made. Since the MAC address of ABFE is recognized as a pseudo port, the frame is discarded and is not communicated to the original source device, that is, GPP-2

As an example in which communication is requested from a source device having a higher security classification level than the destination device, consider the scenario in which the secure channel of the JTRS 50 attempts to send a frame to the INS 52. In this instance, the virtual local area network switching device 60 receives an ARP request from port 10, i.e., the secure channel, of the JTRS with an intended destination having an IP address of .104. The virtual local area network switching device then determines the security classification level associated with an IP address of .104. Since the security classification level of the intended destination is less than the security classification level of the source device, the frame is discarded. Additionally, the attempted security breach may also be recorded in an audit log or the like.

Similarly, in instances in which a source device attempts to write to a destination device which has a lower security classification level than the source device, such as in instances in which the secure port of GPP-2 44 attempts to write directly to the DTU 56, the frame is again discarded. In this regard, the virtual local area network switching device 60 may receive the frame, such as a UDP data packet, on port 3 from the secure port of the GPP-2 with an intended destination device identified by MAC address of AB0A. The virtual local area network switching device then determines the security classification level associated with a MAC address of AB0A. Since the security classification level of the intended destination device is less than the security classification level of the source device, the frame is discarded. As noted above, the attempted security breach may also be recorded in an audit log or the like.

Furthermore, as an example of the reconfiguration of the virtual local area network switching device 60 by the controller 62, consider the instance in which an unclassified cryptographic key is loaded into the first channel of the JTRS 50, thereby changing the first channel of the JTRS (the channel associated with port 10 of the virtual local area network switching device) from a more secure security classification level to a less secure security classification level. In this instance, the virtual local area network switching device would receive an ARP request on port 0 from the controller with an intended destination having an IP address of .113, that is, the IP address of the virtual local area network switching device. The virtual local area network switching device would then determine the security classification level associated with an IP address of .113. Since the security classification level of the intended destination device equals the security classification level of the source device, the virtual local area network switching device would transmit an ARP response of AB0E on port 0 to the controller, that is, the virtual local area network switching device would provide its MAC address to the controller. Thereafter, the virtual local area network switching device would receive a frame, such as a UDP rule change command, on port 0 from the controller with an intended destination having a MAC address of AB0E. The virtual local area network switching device would then change the security classification level associated with port 10 to be less secure based upon the frame received from the controller. Thereafter, the virtual local area network switching device can construct and transmit a frame, such as a rule change successful frame, on port 0 with the MAC address sent to AB09, which is the MAC address of the controller.

As described above, a virtual local area network switching device 60 and an associated computer system 40 and method are provided according to embodiments of the present invention to provide for operation in accordance with a plurality of different security classifications. As such, the virtual local area switching device and the associated computer system and network of one embodiment can provide an HA MLS network, such as for deployment in a tactical edge environment or the like, while only requiring some, but not all of the devices and the code to be certified to the HA level. In this regard, by controlling the communications between the computer 42 and the peripheral units via the virtual local area network switching device, however, only the virtual local area network switching device and the controller 62 need be certified or trusted to an HA level.

As described above, FIG. 4 is a flowchart of a method according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described may be embodied by computer program instructions. As will be appreciated, any such computer program instructions may be loaded onto a computer or other programmable apparatus (i.e., hardware), such as the computing device 80 of the virtual local area network switching device 60 to produce a machine, such that the instructions which execute on the computer or other programmable apparatus create means for implementing the functions specified in the flowcharts block(s) or step(s). These computer program instructions may also be stored in a computer-readable memory, such as memory device 82 of the virtual local area network switching device, that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer system configured to operate in accordance with a plurality of different security classifications, the computer system comprising:
   a computer comprising at least one processor;
   a virtual local area network switching device comprising a plurality of ports and in communication with the computer via at least one of the ports; and
   a plurality of peripheral hardware units in communication with the virtual local area network switching device via respective ports thereof, wherein the plurality of peripheral hardware units comprise at least one peripheral unit configured to have a first security classification and at least one peripheral unit configured to have a second security classification that is less secure than the first security classification,
   wherein the virtual local area network switching device comprises a memory configured to store information associating a plurality of the ports with the security classification of the respective peripheral unit in communication therewith,
   wherein the virtual local area network switching device is configured to receive a frame from a source device that bears an address of a destination device, wherein the source and destination devices comprise respective ones of the computer and the peripheral hardware units, and wherein the virtual local area network switching device is further configured to change a source address associated with the frame prior to forwarding the frame to the destination device so as to no longer reference the source device in an instance in which the security classification of the destination device is greater than the security classification of the source device such that a reply from the destination device that is received by the virtual local area network switching device is prevented from being forwarded to the source device.

2. A computer system according to claim 1 wherein the memory of the virtual local area network switching device is configured to store information associating each port with both a logical address and a physical address of the respective peripheral hardware unit or computer in communication therewith.

3. A computer system according to claim 2 wherein the virtual local area network switching device is configured to receive a request from the source device for the physical address of the destination device based upon the logical address of the destination device in order to facilitate communication between the source device and the destination device, and wherein the virtual local area network switching device is further configured to provide the physical address of the destination device to the source device once the virtual local area network switching device has made a determination that the request should be granted based upon the respective security classifications of the source device and the destination device.

4. A computer system according to claim 1 wherein the virtual local area network switching device is configured to determine when the frame should be transmitted to the destination device based on the respective security classifications of the source device and the destination device and to thereafter forward the frame and the source address to the destination device when a determination is made that the frame should be transmitted to the destination device based upon the respective security classifications of the source device and the destination device.

5. A computer system according to claim 1 wherein the virtual local area network switching device is further configured to receive a response to the frame from the destination device that is directed to the source address that has been changed so as to no longer reference the source device, and to discard the response without forwarding the response to the source device.

6. A computer system according to claim 3 wherein the virtual local area network switching device is configured to grant the request to communicate when the security classification of the source device is no more secure than the security classification of the destination device, and to deny the request to communicate when the security classification of the source device is more secure than the security classification of the destination device.

7. A computer system according to claim 1 further comprising a controller in communication with the virtual local area network switching device for modifying the information stored by the memory.

8. A virtual local area network switching device comprising:
   a computing device comprising a plurality of ports for individually communicating with a computer and a plurality of peripheral hardware units, wherein at least one peripheral hardware unit is configured to have a first security classification and at least one peripheral hardware unit configured to have a second security classification that is less secure than the first security classification; and a memory device configured to store information associating a plurality of the ports of the computing device with the security classification of the respective peripheral hardware unit in communication therewith, wherein the computing device is configured to control communications with the peripheral hardware units in accordance with the respective security classifications, wherein the computing device is also configured to receive a frame from a source device that bears an address of a destination device, wherein the source and destination devices comprise respective ones of the computer and the peripheral hardware units, and wherein the computing device is further configured change a source address associated with the frame prior to forwarding the frame to the destination device so as to no longer reference the source device in an instance in which the security classification of the destination device is greater than the security classification of the source device such that a reply from the destination device that is received by the virtual local area network switching device is prevented from being forwarded to the source device.

9. A virtual local area network switching device according to claim 8 wherein the memory device is configured to store information associating each port with both a logical address and a physical address of the respective peripheral hardware unit or computer in communication therewith.

10. A virtual local area network switching device according to claim 9 wherein the computing device is configured to receive a request from the source device for the physical address of the destination device based upon the logical address of the destination device in order to facilitate communication between the source device and the destination device, and wherein the computing device is further configured to provide the physical address of the destination device to the source device once the computing device has made a determination that the request should be granted based upon the respective security classifications of the source device and the destination device.

11. A virtual local area network switching device according to claim 8 wherein the computing device is configured to determine when the frame should be transmitted to the destination device based on the respective security classifications of the source device and the destination device, and to thereafter forward the frame and the source address to the destination device when a determination is made that the frame should be transmitted to the destination device based upon the respective security classifications of the source device and the destination device.

12. A virtual local area network switching device according to claim 8 wherein the computing device is further configured to receive a response to the frame from the destination device that is directed to the source address that has been changed so as to no longer reference the source device, and to discard the response without forwarding the response to the source device.

13. A virtual local area network switching device according to claim 10 wherein the computing device is configured to grant the request to communicate when the security classification of the source device is no more secure than the security classification of the destination device, and to deny the request to communicate when the security classification of the source device is more secure than the security classification of the destination device.

14. A method of communicating with a plurality of peripheral hardware units having a plurality of different security classifications, the method comprising:

providing a virtual local area network switching device having a plurality of ports and a memory configured to store information associating each port with the security classification of the respective peripheral hardware unit or computer in communication therewith, wherein at least one of the computer and the peripheral hardware units is configured to have a first security classification and at least one of the computer and the peripheral hardware units is configured to have the second security classification that is less secure than the first security classification;

receiving a request from a source device comprising at least one of the computer and the peripheral hardware units to communicate via the virtual local area network switching device with a destination device comprising another one of the computer and the peripheral hardware units, wherein the request comprises a frame that bears the physical address of the destination device;

determining when the request to communicate should be granted and the frame should be transmitted to the destination device based upon the respective security classifications of the source device and the destination device;

changing a source address associated with the frame prior to forwarding the frame to the destination device so as to no longer reference the source device in an instance in which the security classification of the destination device is different than the security classification of the source device such that a reply from the destination device that is received by the virtual local area network switching device is prevented from being forwarded to the source device.

15. A method according to claim 14 wherein providing the virtual local area network switching device comprises providing the virtual local area network switching device having the memory configured to store information associating each port with both a logical address and a physical address of the respective peripheral hardware unit or computer in communication therewith.

16. A method according to claim 15 wherein receiving the request comprises receiving the request for the physical address of the destination device based upon the logical address of the destination device, and wherein the method further comprises providing the physical address of the destination device to the source device when a determination is made that the request should be granted based upon the respective security classifications of the source device and the destination device.

17. A method according to claim 14 further comprising forwarding the frame and the source address to the destination device when a determination is made that the frame should be transmitted to the destination device based upon the respective security classifications of the source device and the destination device.

18. A method according to claim 14 further comprising:

receiving a response to the frame from the destination device and directed to the source address that has been changed; and discarding the response without forwarding the response to the source device.

19. A method according to claim 14 wherein determining when the request to communicate should be granted comprises granting the request to communicate when the security classification of the source device is no more secure than the security classification of the destination device, and denying the request to communicate when the security classification of the source device is more secure than the security classification of the destination device.

20. A method according to claim 14 wherein providing the virtual local area network switching device comprises providing the virtual local area network switching device having a security classification that is at least as secure as the first security classification.

* * * * *